UNITED STATES PATENT OFFICE.

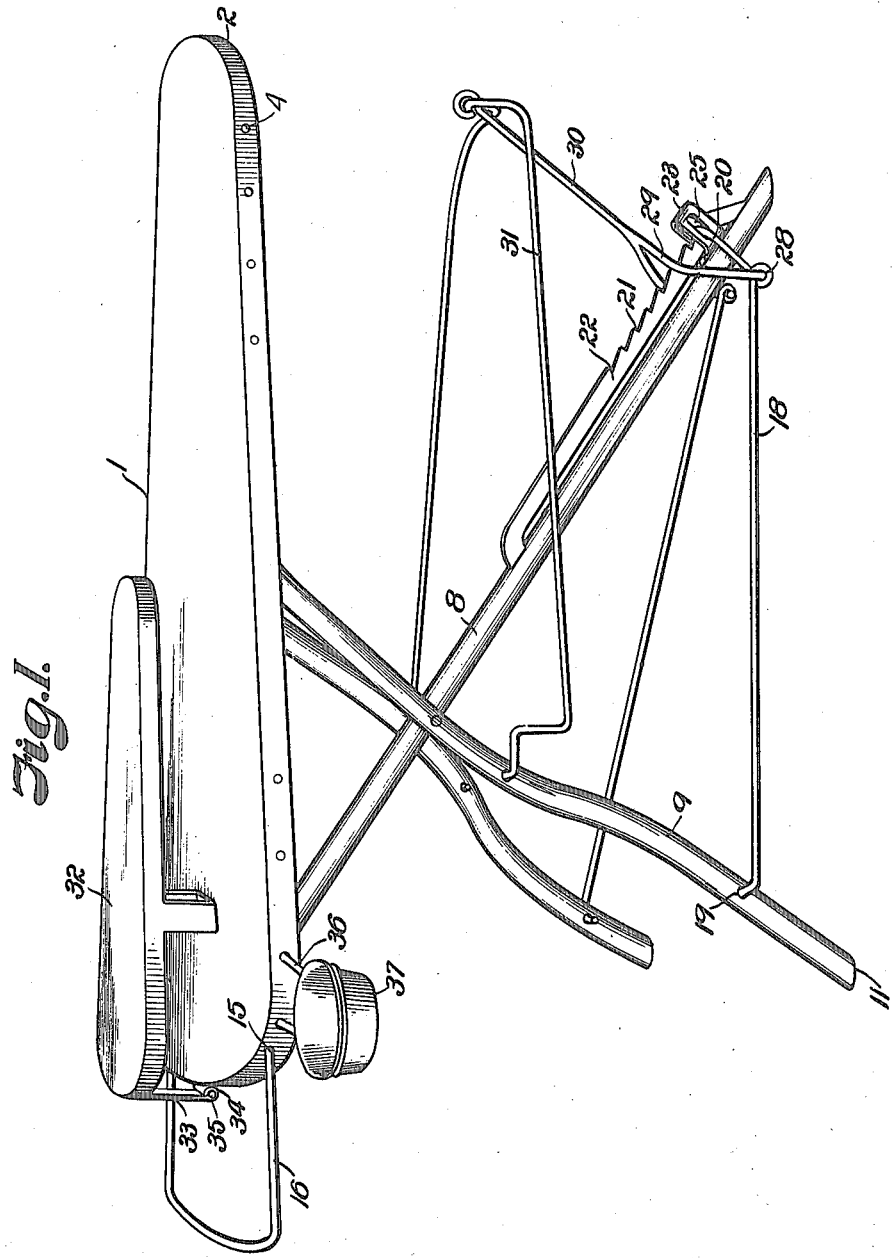

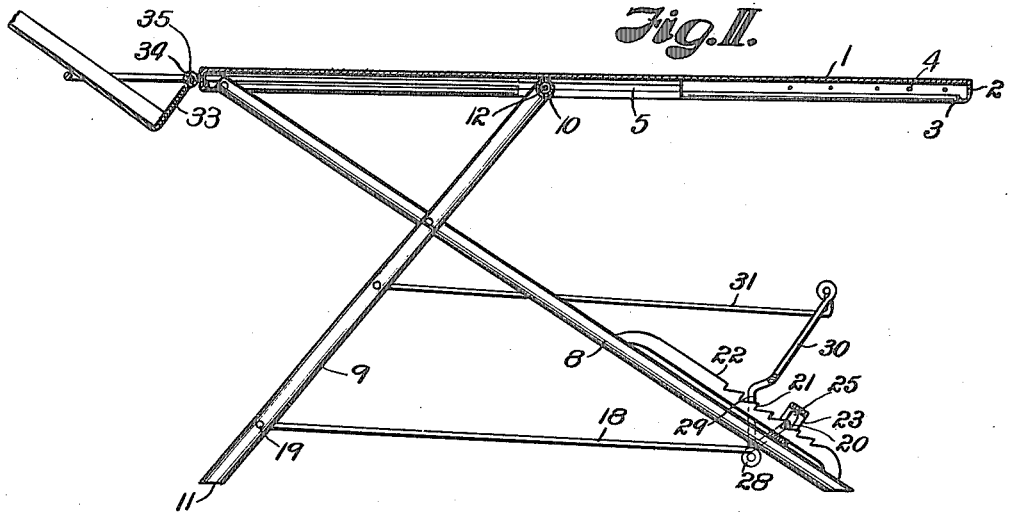
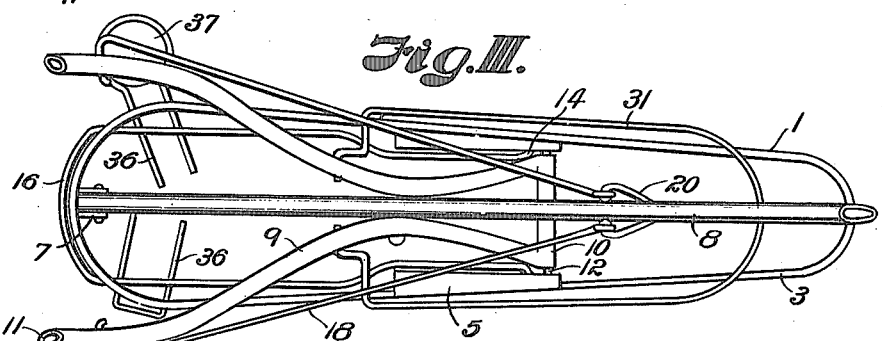
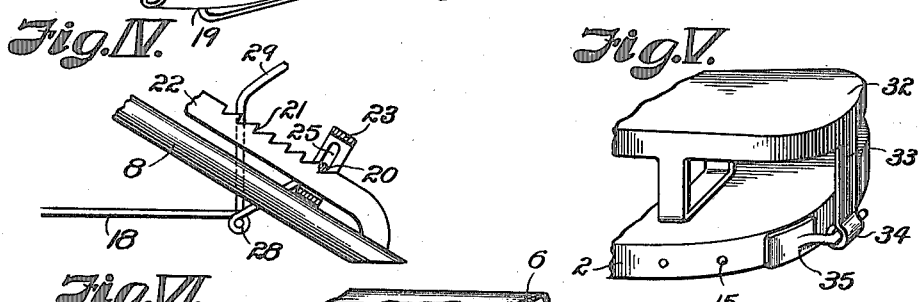
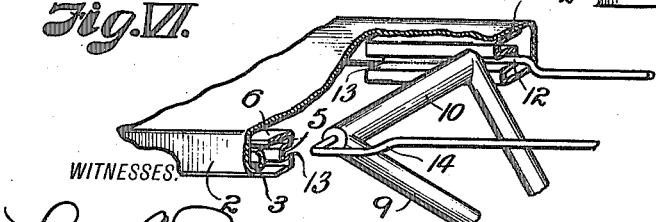

FRED G. HOFFINE, OF KANSAS CITY, MISSOURI, ASSIGNOR TO HOME IRONING BOARD COMPANY, OF KANSAS CITY, MISSOURI, A CORPORATION OF MISSOURI.

IRONING-BOARD.

1,162,778.  Specification of Letters Patent.  Patented Dec. 7, 1915.

Application filed April 2, 1915. Serial No. 18,691.

*To all whom it may concern:*

Be it known that I, FRED G. HOFFINE, a citizen of the United States, residing at Kansas City, in the county of Jackson and State of Missouri, have invented certain new and useful Improvements in Ironing-Boards; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to ironing boards, and has for its principal object to provide a folding board with suitable support and means for bracing the support to hold the board in elevated position and insure against its collapse when in use.

It is also an object of the invention to provide a board of this character with suitable lugs for supporting articles after they have been ironed and so combine the racks with the supporting legs as to automatically extend the racks when the board is arranged for use, and retract the racks when the board is folded.

In accomplishing this and other objects of the invention I have provided improved details of structure, the preferred forms of which are illustrated in the accompanying drawings, wherein:—

Figure I is a perspective view of an ironing board containing my improvements. Fig. II is a longitudinal section of the board and side elevation of the supporting legs. Fig. III is a bottom plan view of the complete board in folded position. Fig. IV is an enlarged detail elevation of the locking rack for retaining the supporting legs in position after they have been spread to provide the desired elevation of the board. Fig. V is a detail perspective of the butt end of the board, showing the mounting of an auxiliary or sleeve board. Fig. VI is a detail perspective with part of the board broken away to illustrate a part of the bracing leg and its guide, together with a portion of one of the racks.

Referring more in detail to the drawings: 1 designates the board proper which is preferably formed from a single piece of sheet metal, having its edges turned down or beaded to stiffen the material and retain the shape thereof; the edge flange 2 being turned upwardly beneath the board as a lip 3 throughout the greater extent of the flange in order to obviate a sharp edge at the bottom of the board, and the said flanges being provided with apertures 4, through which a cloth cover or pad may be sewed to the board.

At about the center of the board the flange 2 is extended at opposite sides of the board to form a U-shaped guide 5 for the bracing leg hereinafter described; the free edge of the flange at this part being bent back parallel with the top of the board to form a lip 6 which engages the under face of the board to support the latter and brace the guide.

Pivotally mounted between straps 7 that project inwardly from the flange 2 at the butt end of the board is a leg 8 preferably formed from tubular metal and having its free end beveled so that it will seat flatly on the floor.

Pivotally mounted on and straddling the leg 8 is a bracing leg 9, having a head 10 adapted for engaging the flat under face of the board 1, and having free ends provided with beveled faces 11 for engaging the floor at opposite sides of the main supporting leg, in order to give the board a three-point support that will provide a substantial base and hold the board steady when it is in use.

Attached to and preferably extending through the head 10 is a rod 12 which projects sufficiently beyond the ends of the head to lie within the grooves 13 in the U-shaped guides 5, so that the leg is held in proper relation to the other parts while being free to slide longitudinally beneath the board. The rod 12 has shoulders 14 spaced slightly from the head 10 and is extended through apertures 15 in the butt end of the board to provide a U-shaped rack 16 for supporting articles that have been ironed on the board; the preferred construction of the guide and rack consisting of forming the rod in a single piece bent upon itself with the central part exterior to the board and the ends turned inwardly into apertures in the ends of the head 10.

In order to hold the supporting legs in adjusted position after they have been placed as described, I provide a latch bar 18; the free ends of which are pivotally mounted in apertures 19 in the lower ends of the bracing legs 9 while its central portion comprises a V-shaped latch 20 which is adapted to take into notches 21 in a rib 22 that is fixed to and spaced from the main supporting leg 8, the particular construction herein illustrated being that wherein the rib 22 has its teeth in its upper face and the latch provided with a keeper 23, having a base slidable beneath the rib and having slide slots 25 through which the latch is projected above the rib so that when the legs 8 and 9 are moved toward each other, the latch 20 lifts in rib 22, the lifting movement being limited by the keeper 23, to retain the latch close to, while free from the rib.

With this construction the latch rod 18 comprises eyes 28 near its central position, carrying the ends of a yoke 29, having a body 30 pivotally connected with the end of a rack 31 which is pivotally mounted on the bracing leg 9, so that when the end of the rack is lifted the yoke lifts the latch 20 out of its engagement with the teeth of the rib so that the board may be collapsed; it being apparent that when the board is open and weight placed thereon, the weight tends to force the legs to open position so that the latch pulls against the tooth in which it is engaged to securely hold the parts in place.

I also provide the board with an auxiliary or sleeve board 32, having a strap 33 at its base end provided with a tubular member 34 which is adapted to slip over the end of a pin bracket 35 which is securely mounted on the end of the board, and which may be swung back to rest on the extended rack 16 when not in use (Fig. II). At the same end of the board I preferably provide sliding brackets 36 for supporting an iron (not shown) and for carrying a cup 37 for containing water with which to sprinkle the clothing being ironed.

In using the board, presuming the parts to be constructed and assembled as described, and with the board collapsed for shipping or storage, the supporting legs are folded flat along the inner face of the board and the clothes rack 16 nested between the side flanges. When the board is to be used the operator grasps the main supporting leg 8 and forces the same away from the board body. This movement tends to move the bracing leg away from the supporting leg because of the pivotal connection between the legs and the pivotal connection of the supporting leg, and the sliding connection of the bracing leg with the board body. As soon as the legs have been extended to support the board at the desired height and pressure is placed on the board, the pressure will tend to depress the inclined upper end of the bracing leg so that the free ends thereof are forced backwardly to draw the latch into one of the notches on the rib 22, and that the more weight that is placed on the board the greater will be the locking pressure that is exerted by the latch on the toothed rib so that the legs are held securely in their spread relation to maintain the position of the board.

It is also apparent that as the clothes rack 16 is connected with the head of the bracing leg, this rack will be extended beyond the board as the head of the bracing leg is moved backwardly, so that the rack is automatically placed in position for use as the board is opened.

When the board is to be collapsed after use, the operator need only lift the end of the rack 31 in order to disconnect the latch from its toothed rib and draw the rack toward the board, as such movement tends to collapse the supporting legs so that they fold against the bottom of the board.

Having thus described my invention, what I claim as new therein, and desire to secure by Letters-Patent, is:—

1. An ironing board comprising a body member, a leg pivotally mounted on the body member, a bracing leg mounted on the first named leg and having a head adapted for adjustable engagement with the board body, a toothed rib on the main leg, a latch on the bracing leg adapted for engagement in the teeth of said rib, and a keeper for anchoring the latch to the main leg while permitting sliding travel of the latch along the rib.

2. The combination with a board body, of a leg pivotally connected with said body, a bracing leg pivotally mounted on the first named leg and having a head adapted for adjustable engagement with the body, a toothed rib carried by and spaced from the main leg, a latch rod on the bracing leg, a latch on said rod adapted for engaging the teeth on said rib, and a slotted keeper on said latch projected between the rib and its carrying leg.

3. The combination with a board body, of a leg pivotally connected with said body, a bracing leg pivotally mounted on the first named leg and having a head adapted for adjustable engagement with the body, a toothed rib carried by and spaced from the main leg, a latch rod on the bracing leg, a latch on said rod adapted for engaging the teeth on said rib, a slotted keeper on said latch projected between the rib and its carrying leg, a rack pivotally mounted on the bracing leg, and a rod connected with said rack and having yokes straddling the main leg and pivotally connected with said latch, for the purpose set forth.

4. The combination with a board body of a leg pivotally connected with said body, a second leg pivotally mounted on the first leg and having a head adapted for adjustable engagement with the body, a toothed rib carried by and spaced from the main leg, a keeper having a base member slidably mounted between the main leg and the rib and having a top spaced from the toothed edge of said rib, a latch pivotally connected with the bracing leg and comprising a yoke having a body portion movably anchored in the keeper slot and adapted for engaging the rib teeth for the purpose set forth.

5. The combination with a board body having a depending edge flange provided with apertures at one end and having facing guide members on its under face, a leg pivotally connected with said body, a bracing leg pivotally mounted on the first named leg, and a rod having spaced arms projected through the flange apertures and having guide members located within the guides, and end portions connected with the head of the bracing leg, for the purpose set forth.

In testimony whereof I affix my signature in presence of two witnesses.

FRED G. HOFFINE.

Witnesses:
L. M. DAIST,
C. J. FRIPP.